Nov. 13, 1951 C. E. HUNT, JR 2,575,017

APPARATUS FOR SYNTHESIZING FACSIMILE SIGNALS FROM CODED SIGNALS

Filed July 29, 1950 4 Sheets-Sheet 1

CLAYTON E. HUNT, JR
Inventor

By Daniel J. Mayne
Rolla N. Carter
Attorneys

CLAYTON E. HUNT, JR.
Inventor

Daniel J. Mayne

By Rolla N. Carter

Attorneys

CLAYTON E. HUNT, JR.
Inventor

By Daniel J. Mayne
Rolla N. Carter

Attorneys

Nov. 13, 1951 C. E. HUNT, JR 2,575,017

APPARATUS FOR SYNTHESIZING FACSIMILE SIGNALS FROM CODED SIGNALS

Filed July 29, 1950 4 Sheets-Sheet 4

CLAYTON E. HUNT, JR.
Inventor

By Daniel J. Mayne
Lolla N. Carter
Attorneys

Patented Nov. 13, 1951 2,575,017

UNITED STATES PATENT OFFICE 2,575,017

APPARATUS FOR SYNTHESIZING FACSIMILE SIGNALS FROM CODED SIGNALS

Clayton E. Hunt, Jr., Rochester, N. Y., assignor to Eastman Kodak Company, Rochester, N. Y., a corporation of New Jersey Application July 29, 1950, Serial No. 176,594

6 Claims. (Cl. 178—6.6)

This invention relates to facsimile apparatus and more particularly to a translating mechanism which generates and records facsimile signals corresponding to the characters represented by received coded signals.

The present invention deals with apparatus which will print legible characters from a single input signal and at extremely high speeds.

It is an object of the invention to provide a system capable of high speed translation of a character representing signal into synthetic facsimile signals of the represented character.

In accordance with a principal feature of the invention, a control voltage derived by sensing record cards or other means which will provide successive coded printing signals are applied to an electric matrix including a plurality of electronic tubes arranged in columns and rows in such a manner that the tubes forming a pattern in the shape of the character represented by the control voltage are selectively energized. Each row of tubes is connected to individual recording means which may comprise the separate styli of a multiple styli recording unit such as is described and claimed in patent application Serial Number 174,423 filed July 18, 1950 by Russell G. Thompson. Sequence circuit means operating in timed relation with the feeding of the recording medium functions to render the selectively energized tubes effective, column after column, to operate the related recording elements in proper sequence to build up on the recording medium the character represented by the control voltage applied to the matrix.

Another object of the invention is to provide a circuit arrangement which is capable of analyzing a coded signal and posting a voltage on a terminal individual to the character represented by the signal.

For printing alphabetical characters as well as digits, a six element binary code for the coded signals is preferred. These signals may originate in any manner but the invention contemplates their derivation from punched tabulating cards or perforated tapes.

Apparatus according to the invention will print over three hundred characters a second which is fast enough to make it compatible with high speed digital computers and its use to record intermediate or final results of such computers is contemplated.

The invention will be better understood from the following description when read in connection with the accompanying drawings in which.

Figure 1:
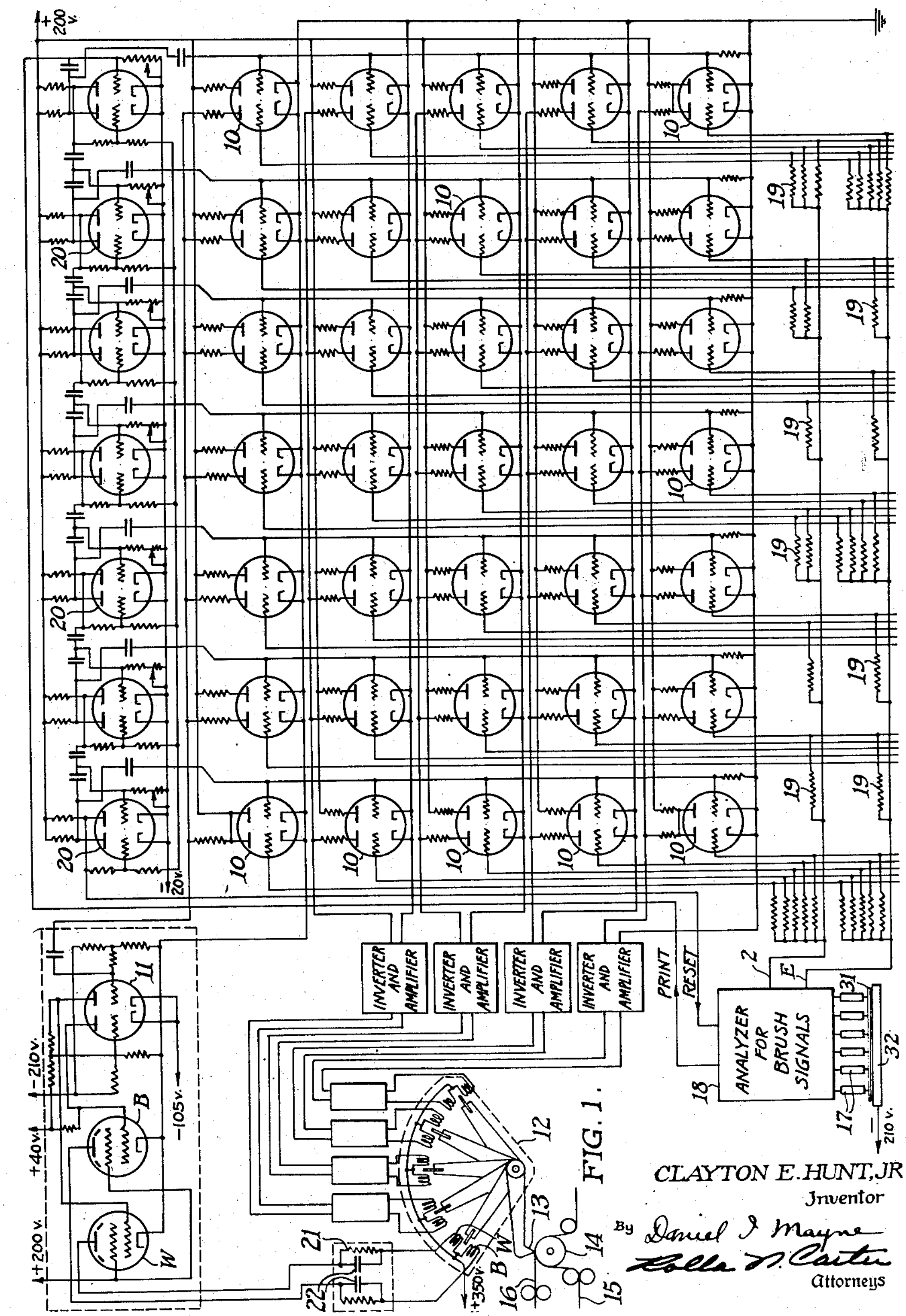
Fig. 1 shows schematically a signal generating matrix incorporated in a unit for recording from a punched card or tape.

The apparatus to be described for the purpose of disclosing the invention has been designed to record or print all characters with a definition in height of seven lines and with five-line definition in width. More or fewer lines may be employed as desired but its believed that seven by five definition gives the lowest resolving power which can be tolerated when it is desired to print characters which are easily legible.

The apparatus to be described for the printing of alphabetical characters as well as digits has been designed for synthesizing facsimile signals from signals coded from six binary elements. Any other code may of course be employed as long as it meets the requirement that unique voltage patterns may be derived for each coded character signal.

Card feeding mechanisms for moving cards under sensing brushes and means for advancing recording mediums past the printing styli are so well known that their description herein is unnecessary.

For synthesizing the proper facsimile signals for reproducing a character represented by a single signal, a group of duotriode tubes 10 are arranged in seven columns of five rows each and are so connected that both grids of each duotriode 10 must be energized to obtain an output from the tube. All of the tubes 10 in a row are connected with their outputs in parallel to the input of a twin triode tube 11 connected as an ordinary inverter stage with its right triode cut off except when its grid is furnished a positive pulse from the output of one of the tubes 10 in its row. The lefthand side of this inverter stage 11 is normally conducting, but is cut off by a negative pulse when the right side starts to conduct. The plate of the right side of the inverter stage 11 is connected to the grid of a power tube "W" and the plate of the lefthand side is connected to the grid of a power tube "B," the outputs of these two power tubes being connected, respectively, to printing coils "W" and "B" of an electromagnetic driver 12 for one of the printing styli 13. The tubes 10 in each row are similarly connected through an inverter and amplifier to the electromagnetic drivers 12 of the other styli of the recorder. When the coil "B" is energized, it presses its associated styli 13 against a printing roller 14 which marks the intervening paper 15 from a carbon paper 16.

Both sides of the thirty-five duotriodes 10 are normally conducting. The left sides of certain of the tubes 10 are cut off by a signal from sensing brushes 17 through a decoder 18, the tubes 10 which are selectively cut off being selected by a network comprising a set of connections for each character to be reproduced of which only two are illustrated, viz., for the characters "2" and "E." It will be noted that the network for the character "2" connects the signal from the decoder 18 through high resistances 19 to the three middle tubes 10 in the first column on the right, the upper and lower tubes 10 in the second column, the upper tube 10 in the third column, the second and third tubes 10 from the top in the fourth column, the next to the bottom tube 10 in the fifth column, the bottom tube 10 in the sixth column and all five tubes 10 in the seventh column. This cuts off the lefthand side of these tubes 10 and it will be noted that the tubes 10 thus conditioned comprise a pattern forming the numeral "2" when viewed from the lefthand side of the drawing. Since no printing signal is produced until both sides of a tube 10 are cut off, a sequence circuit is provided for cutting off in rapid succession the righthand sides of the tubes in the seven columns. As here shown, this sequence circuit comprises seven twin triode tubes 20, each connected as a self-restoring trigger circuit and so associated with each other that when the first of these tubes is triggered, it will, upon restoring itself, trigger the next succeeding tube until all seven tubes have been triggered in rapid sequence. Each of these self-restoring trigger circuits is individually associated with a column of the matrix tubes 10 such that during the time a trigger circuit is in its unstable state the righthand side of all the matrix tubes 10 in its associated column are cut off, with the result that during this unstable stage the tubes 10 in the associated column whose lefthand sides were cut off by the network signal as above described, will furnish a printing signal to the corresponding styli 13 so that with the recording medium 15 moving at the proper speed the character "2" will be built up thereon from top to bottom (see Fig. 2). For decreasing the amount of plate current under D. C. conditions, a high resistance 21 by-passed by a condenser 22 may be used to couple the power tubes B and W to their associated vibrator coils B and W. Under A. C. conditions the condenser 22 allows full supply voltage to be impressed on the vibrator coils B and W.

Figure 2:
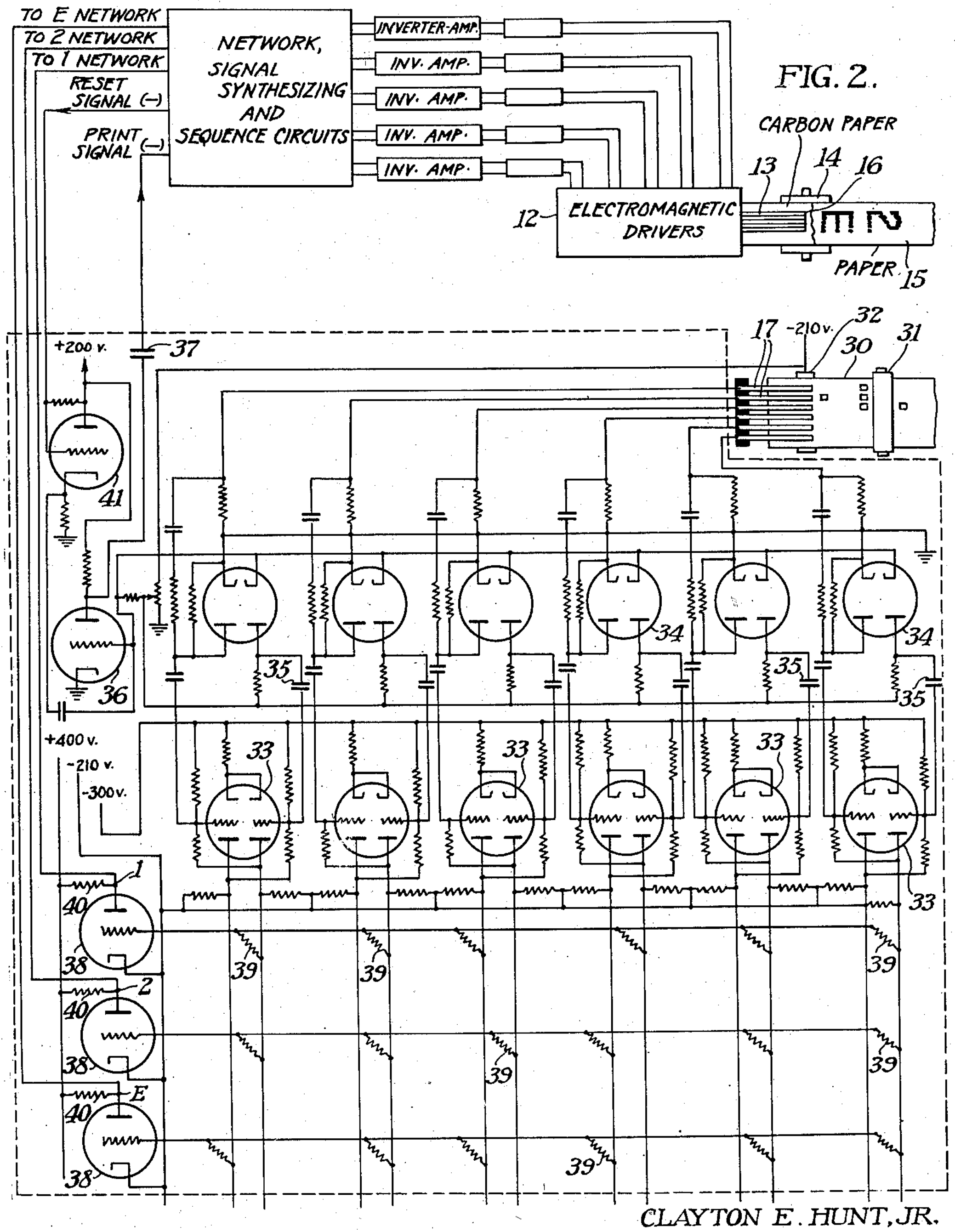
Fig. 2 illustrates the unit of Fig. 1 with emphasis on the details of the signal analyzer.
Figure 3:
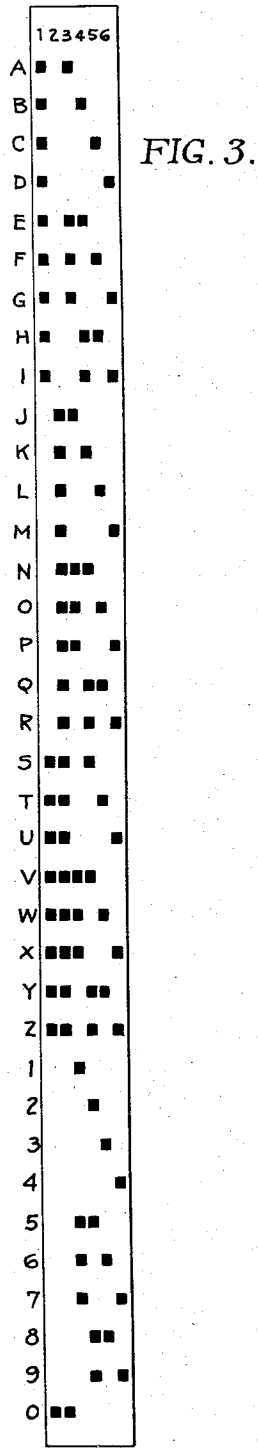
Fig. 3 shows a six element binary code which the units of Figs. 1, 2 and 5 are designed to handle.

A card or tape punched or perforated in the six-element binary code of Fig. 3 may be converted into signals for energizing the proper matrix tubes 10 by the arrangement shown in Fig. 2. As here shown, a perforated tape 30 is moved by suitable means 31 between a group of six sensing brushes 17 and an electrode 32 connected to a high negative voltage. These six sensing brushes 17 are connected to the lefthand side of individual twin triode tubes 33 connected in ordinary flip-flop arrangement. Initially, all six of the flip-flop tubes 33 have their left sides conducting. When one or more of the sensing brushes 17 encounters a perforation, it connects the electrode 32 to the grid of the lefthand side of its associated flip-flop tube 33 which functions to transfer current from the left to the right side of the tube 33, thereby producing a positive pulse from its right grid through a capacitor 35 and the right side of its associated diode 34 to the grid of a tube 36 which thus starts to conduct, thereby generating a negative pulse on its anode which is applied through a capacitor 37 to the righthand grid of the first trigger tube 20, thereby starting the sequence circuit to operate through its cycle.

A series of character-selecting tubes 38, one for each character to be printed, have their grids connected through a high resistance 39 to one side or the other of all six flip-flop tubes 33 in such a manner that a signal must be received simultaneously from all six flip-flop tubes 33 in order to render the character-selecting tube 38 conducting and thus provide a negative potential on the anode terminal of the tube 38 due to its load resistor 40. Only three character-selecting tubes 38 are shown in the drawing and the anode terminals of these tubes are designated by the character the respective tubes represent, i. e., the characters 1, 2 and E.

In the six-element binary code as shown in Fig. 3 the numeral 2 is represented by a single perforation in the fourth position which, when sensed by a brush 17, functions to transfer current from the left to the right side of the flip-flop tube 33 fourth from the left which it will be noted is the only flip-flop tube 33 having its left side connected to the grid of the tube 38 having the anode terminal 2. Thus the grid of this tube 38 has the potential of its cathode and is conducting, while the grids of all the other tubes 38 are connected to at least one flip-flop element which is conducting and are, therefore, subjected to the more negative potential of the cathodes of the tubes 33 which biases them beyond cutoff.

It is thus evident that when the brushes 17 sense a group of perforations in the code tape 30 representing the numeral "2," the corresponding character-selecting tube 38 conducts to post a negative potential on its anode terminal 2 which in turn conditions certain of the matrix tubes 10 as selected by the "2" network. At the same time the tube 36 furnishes a print signal to the first tube 20 of the sequence circuit which operates through its cycle to furnish the electromagnetic drivers 12 successive groups of signals as determined by the conditioned tubes 10, which signals cause the styli 13 to mark the paper 15 in the pattern of the character "2." It will be appreciated that the paper 15 upon which the record is made is advanced under the styli 13 at a speed such that it moves a distance equal to the desired height of a character during the period required for the sequence circuit to complete one cycle.

When the last tube 20 of the sequence circuit restores itself, a negative pulse is furnished to the grid of a normally conducting triode 41 connected as a cathode follower which cuts off the triode 41 and the resulting negative pulse appearing on its cathode is applied through the right side of all the duodiodes 34 to the grids of the right sides of the tubes 33, thereby resetting all the flip-flop tubes 33 to their initial condition in which their left sides are conducting. Any positive signal generated by the breaking of the contact between the sensing brushes 17 and the electrode 32 are clipped by the left side of the corresponding diode 34.

By arranging a plurality of the above-described units in groups, any desired number of parallel columns may be recorded simultaneously on a suitable sheet. With the arrangement described, thirteen parallel channels may be operated by a standard eighty position tabulating card, each channel printing up to twelve or twenty-four characters per card. If the data to be recorded consists entirely of numbers, the units may be simplified by employing ten sensing brushes 17 which themselves constitute the terminals 0, 1, 2, etc., connected to the appropriate networks and to the sequence circuit, thereby eliminating the need for the analyzing circuit of Fig. 2.

Figure 4:
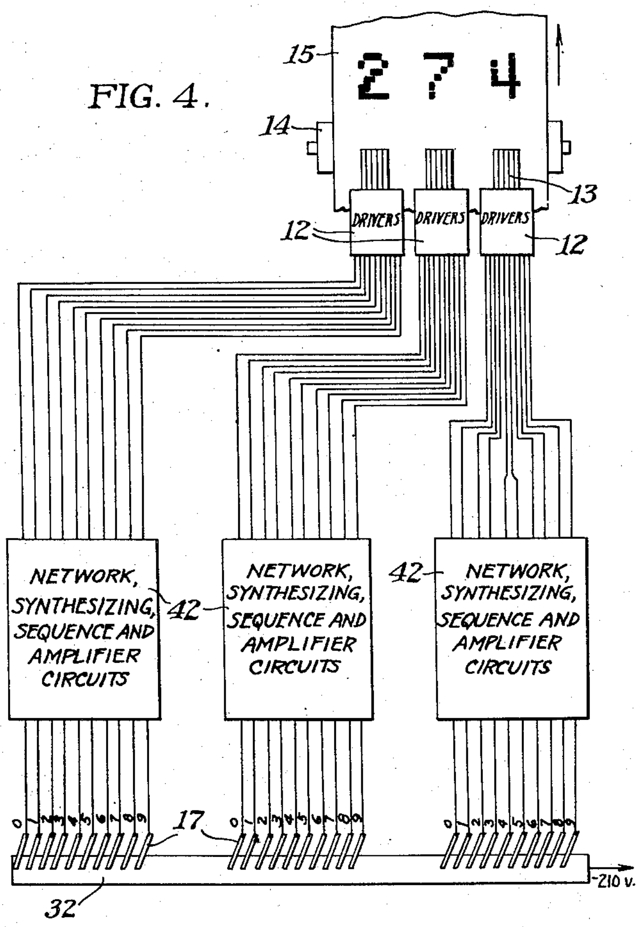
Fig. 4 shows diagrammatically a simplified arrangement for recording digits only.

One arrangement for simultaneously printing three columns of digits is shown diagrammatically in Fig. 4 as comprising three sets of drivers 12, each set having a group of styli 13 for recording on a record medium 15 moved between the three groups of styli and a printing roller 14. Each set of drivers 12 is connected to ten analyzing brushes 17 through a circuit 42 which translates the signal received when a brush 17 contacts the electrode 32 into facsimile signals for the digit represented by such brush 17.

For printing lines rather than columns the matrix tubes 10 are arranged in five columns and seven rows for operating a recorder having seven styli 13. The need for this modification is obvious from the fact that the characters to be printed are seven units of definition high and five units wide. If greater resolving power is desired, the number of units of definition may, of course, be increased.

Figure 5:
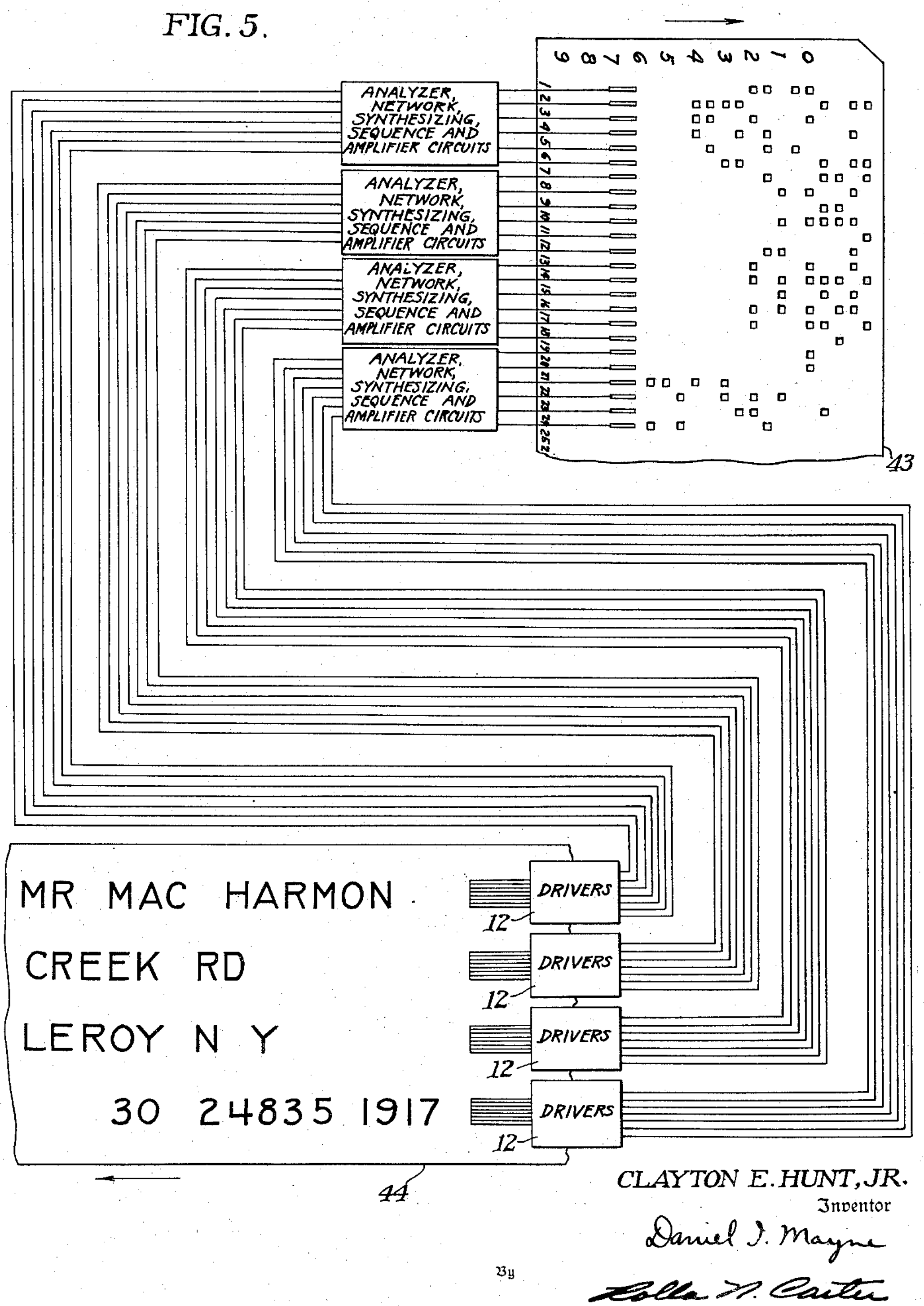
Fig. 5 is a conventionalized showing of an embodiment of the invention adapted for printing address labels.

One important application of an arrangement for printing lines lies in the field of printing address labels for the mailing of magazines or other items. Fig. 5 is a highly conventional showing of the invention arranged for the printing of address labels from ordinary tabulating record cards 43 having perforations located in accordance with the code shown in Fig. 3 for representing the letters and digits to be printed on the address label. The perforations for each line to be printed occupy six columns and up to twenty-four index point positions. In Fig. 5 the index point positions are numbered as on a standard record card and in order to accommodate the twenty-four possible positions at present required for address labels it will be noted that the perforations occupy the spaces between the index positions as well as the positions themselves.

Referring still to Fig. 5, it will be evident that when the card 43 is advanced as indicated under the sensing brushes while a tape 44 is advanced in printing relation past the styli of the four drivers 12, the intelligence represented by the perforations in the four groups of six columns each will be printed in legible form on the tape 44.

As was stated above, the apparatus of the invention is indifferent to the origin of the character-representing signals it receives and the use of sensing brushes for deriving these signals have been exclusively illustrated because of the widespread use of equipment of this type which can more readily be converted to incorporate the present invention.

The arrangement of the relay tubes 10 has for convenience of description been referred to as a matrix but it will be appreciated that the term matrix relates to the functional relationship of the tubes 10 and in nowise limits their actual spatial positions. Also, it will be obvious to those skilled in the art that the relay function of the tubes 10 may be performed by other circuit arrangements which will furnish a printing signal only when two signals are simultaneously applied thereto.

Also, while electromagnetically-actuated styli for carbon paper recording have been described for printing, it is to be understood that the facsimile signals synthesized in accordance with the invention may be employed to actuate any of the wel known facsimile recording heads.

The modifications described for the purpose of disclosing the fundamental features of the invention are not to be taken as limiting since many changes and adaptations will be obvious to those skilled in this art without departing from the scope of the appended claims.

What I claim as new and desire to secure by Letters Patent of the United States is:

1. A system for translating coded character signals into a visual representation of the characters comprising analyzer means for providing from each coded signal an electric signal on one of a plurality of terminals individual to the character represented thereby, a plurality of electronic tubes arranged in the equivalent of the columns and rows of a matrix, a circuit network individual to each character to be represented and connected to certain of the electronic tubes and to one of the terminals so that a signal on said one of the terminals conditions said certain tubes, the outputs of the electronic tubes in each row being connected in parallel, marking means for following each of a multiplicity of collateral paths extending along a surface on which the representation is to appear, each of said marking means being individual to a corresponding row of the electronic tubes, circuit means for energizing the columns of tubes in rapid succession to cause the conditioned tubes in each column to provide an output while so energized, and means controlled by the output of each row of tubes for operating the corresponding marking means.

2. A recording system for utilizing character-representing electric signals received in sequence comprising a separate terminal for each character to be recorded, a circuit responsive to the received signals for providing potentials on the terminals corresponding to the characters represented by the signals, a plurality of switching means, each requiring two simultaneously applied signals to complete a switching operation, arranged equivalent to the columns and rows of a matrix, the switching means in each row being connected in parallel between a pair of buses, means individual to and operative upon a switching operation between each pair of buses for marking each of a multiplicity of collateral paths extending along a record surface, a network individual to each terminal for applying the potential of the terminal as a signal to a predetermined combination of the switching means corresponding to the character represented by the associated terminal, and means for applying a signal in succession to each column of switching means, whereby the marking means are operated simultaneously from the rows in columnar sequence in accordance with the switching means which received a signal from the network.

3. Apparatus for recording in columnar form digital data received as an electric pulse on a terminal individual to the digit represented by the electric pulse, a row of recording elements, means for feeding a recording medium transversely past and in marking relation to the row of recording elements, individual means for actuating the recording elements singly and in combinations, a plurality of electronic relays connected in parallel to each recording element actuating means so that operation of any one of said relays will energize the recording element actuating means connected thereto, a circuit network individual to each terminal for selectively conditioning said relays in accordance with the digit represented by the electric pulse received on the terminal, and means operative upon the receipt of an electric pulse on any of the terminals for selectively operating in a predetermined sequence the selectively conditioned relays, whereby the actuating means for the recording elements are energized to mark the rcording medium in the form of the digit appropriate to the terminal receiving the electric pulse.

4. In apparatus for translating a series of coded character signals into a multiple series of electric signals corresponding to a parallel scanning of the coded characters in succession, a plurality of relays arranged equivalent to the columns and rows of a matrix, the relays in each row being connected in parallel between a pair of buses so that the operation of any relays in a row furnishes a signal to its buses, a network individual to each character for selectively conditioning, when energized, the relays in accordance with the character to which the network is individual, means for operating the conditioned relays in columnar sequence, whereby a series of signals are furnished each pair of buses, and analyzing means responsive to each coded signal for energizing the network individual to the character represented by the signal.

5. The apparatus described in claim 4 wherein the means for operating the conditioned relays in columnar sequence comprises a plurality of self-restoring trigger circuits, each having a stable and an active state, connected in cascade so that as each trigger circuit returns to its stable state it triggers the next succeeding trigger circuit and each trigger circuit being coupled to an individual column of relays so that during the times the trigger circuits are in their active states they furnish a signal to the relays in their associated columns.

6. The apparatus described in claim 5 wherein each time the analyzer means energizes a network it furnishes a triggering pulse to the first of the cascade connected trigger circuits.

CLAYTON E. HUNT, Jr.

No references cited.